June 17, 1941.  B. H. S. BEACH  2,246,235
INTERNAL COMBUSTION ENGINE
Filed Jan. 18, 1939  2 Sheets-Sheet 1

INVENTOR:
B. H. SPARLING BEACH,
BY
ATTORNEY.

June 17, 1941.    B. H. S. BEACH    2,246,235
INTERNAL COMBUSTION ENGINE
Filed Jan. 18, 1939    2 Sheets-Sheet 2
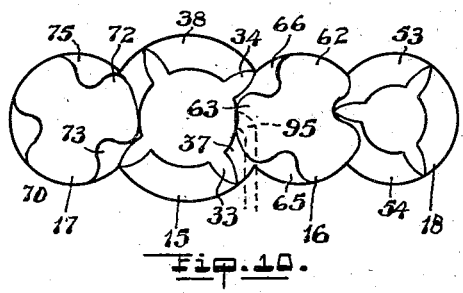
Fig. 10.
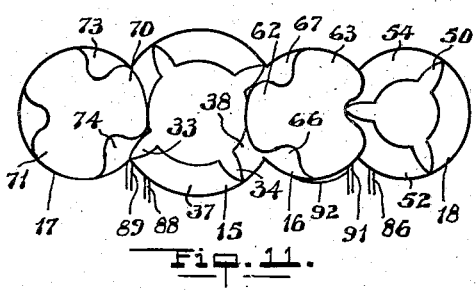
Fig. 11.
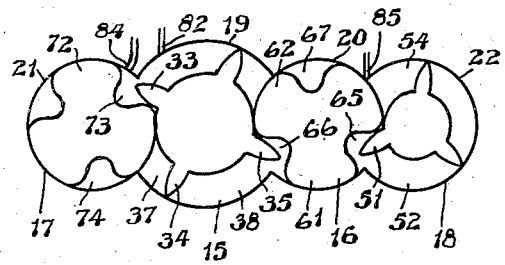
Fig. 8.
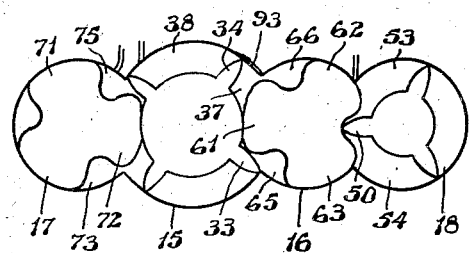
Fig. 9.
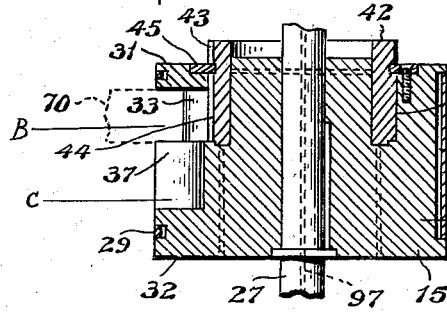
Fig. 6.
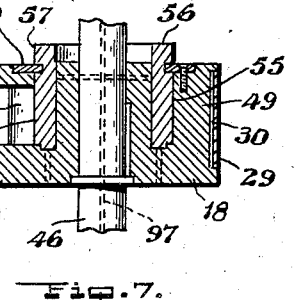
Fig. 7.
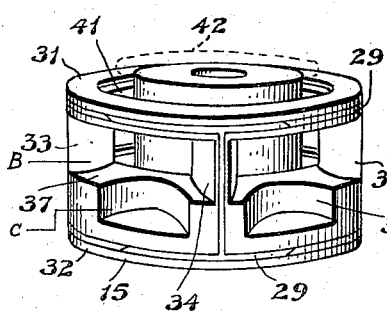
Fig. 3.
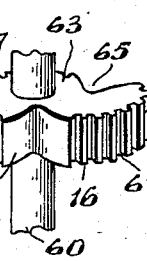
Fig. 4.
Fig. 5.
INVENTOR:
B. H. SPARLING BEACH,
BY
ATTORNEY.

Patented June 17, 1941

2,246,235

UNITED STATES PATENT OFFICE 2,246,235

INTERNAL COMBUSTION ENGINE

Benson H. Sparling Beach, Ottawa, Ontario, Canada

Application January 18, 1939, Serial No. 251,635

11 Claims. (Cl. 123—13)

This invention relates to internal combustion engines and more particularly to internal combustion engines of the rotary type.

One of the objects of the present invention is to provide a device of this character which embodies novel and practical means for introducing, compressing and igniting combustible gases and for the complete scavenging of the spent gases of combustion and in which an established pressure propels a power generating unit and associated co-ordinates in a rotary manner.

Another object of the invention is to provide a device of this character wherein the power-to-weight ratio is increased and the fuel consumption is decreased.

A further object of the invention is to provide a device of this character which consists of few operating and no reciprocating parts, is rugged and compact in structure, universally adaptable to anti-friction bearings and one in which new standards of vibrationless performance and high speed endurance are created.

A still further object is to provide an engine of this type in the design of which any desirable compression pressure may be effected.

An additional object of the invention is to provide an engine of the rotary type in which efficient means are provided for compression sealing and the necessary cooling.

Yet another object is to provide a rotary engine wherein the merging of consecutive cycles of operation produces smooth uninterrupted action which, in the combustion phase, may serve to ignite succeeding charges of compressed combustible fuel thereby providing auxiliary igniting means.

A yet further object of the invention is to employ metals in the construction of the engine which have a low coefficient of expansion so that minimum tolerances of precision fits between operating parts are maintained without substantial variation at all engine temperatures.

Having regard to the foregoing and other objects and advantages which will become apparent as the description proceeds, the invention consists essentially in the novel combination and arrangement of parts hereinafter described in detail and illustrated in the accompanying drawings in which:

Fig. 3 is a perspective view of the rotary power unit shown in detached form illustrating one means of arranging the combustion chambers therein and showing the ring gear member in dotted lines.

Fig. 4 is a perspective view of the rotary compressor unit.

Fig. 5 is a perspective view of the rotary scavenging unit shown in detached form with the ring gear member removed for purposes of clarity.

Fig. 6 is a section on the line 6—6 of Fig. 2 taken through the center of the rotary power unit.

Fig. 7 is a section on the line 7—7 of Fig. 2 taken through the center of the rotary scavenging unit, and Figs. 8, 9, 10 and 11 are schematic illustrations designed to set forth operative phases of the cycle of the engine.

Figure 2:
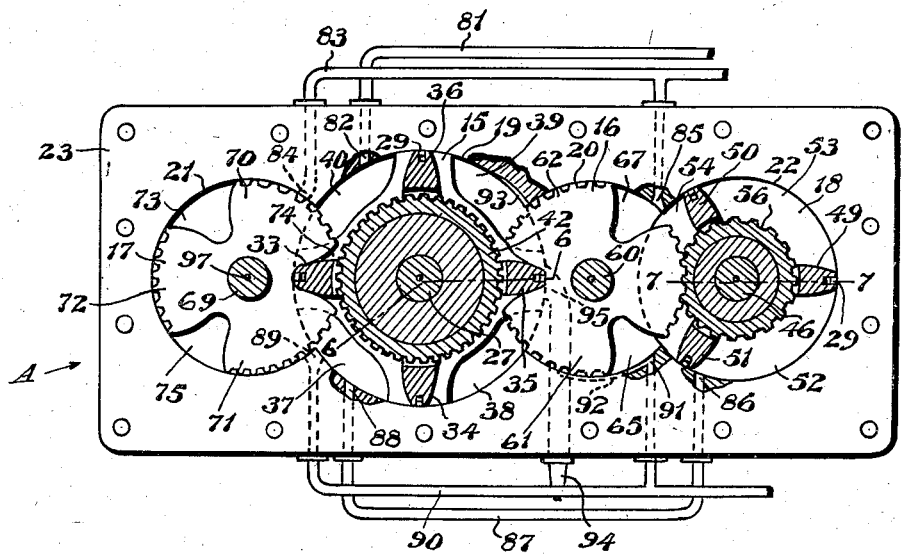
Fig. 2 is a section taken on the line 2—2 of Fig. 1 with the cylinder block and body of the segmental gears shown in plan for purposes of clarity and distinction.

Referring now to the drawings in which like letters and characters designate corresponding parts in the various illustrations, the letter A indicates the engine as a whole which includes rotary power unit 15, rotary compressor unit 16, rotary air induction unit 17 and rotary scavenging unit 18 operatively mounted in cylinders 19, 20, 21 and 22 respectively of cylinder block 23. Further operative parts include main drive shaft 24 upon which is mounted gear 25 which in turn is meshingly engaged by gear 26, the latter gear being mounted upon shaft 27 of the unit 15.

In the construction of the cylinder block and rotors, metals having a low coefficient of expansion are employed thus establishing constant clearances at all engine temperatures. Anti-friction bearings 28 for the respective rotor shafts provide means for substantially floating the rotors within their respective cylinders. The carefully determined clearances between rotors and cylinders permit a film of oil to serve as a compression seal during high speed performance. In low speed engines of this design, a series of I shaped segments 29 of arcuate formation are mounted in recesses 30 in the peripheral walls of the rotors 15 and 18 and serve as compression seals.

One of the novel features of the present invention is the rotary power unit 15 more particularly illustrated in Figs. 3 and 6. This unit is cylindrical in form and includes upper and lower head sections 31 and 32 integrally connected by a series of equidistantly spaced vanes 33, 34, 35 and 36. The vanes, it will be observed, together with the upper and lower sections combine to form a series of peripherally arranged chambers 37, 38, 39 and 40. These aforementioned chambers, by virtue of the operation of the units 16 and 17, periodically become sub-divided into upper and lower sections B and C as will be later referred to.

Rotatably mounted within the member 15 in an annular, co-axial recess 41 and extending downwardly to the section 32 is a ring gear 42. This gear as disclosed in Figs. 3 and 6 is formed with upper and lower gear sections 43 and 44 and as a whole is operatively retained in the unit 15 by suitable means such as a split collar or the like 45 which forms a clear divison between the gears. As illustrated in Figs. 2 and 6, section 44 of this gear lies intermediate the sections 31 and 32 at the inner periphery of the vanes 33, 34, 35 and 36. It would be well to note here that the ring gear 42 is rotatable independent of the rotative movement of the unit 15 as will be later referred to The rotary scavenging unit 18, more particularly illustrated in Figs. 5 and 7, is fixedly mounted upon shaft 46 and in structure bears resemblance to rotor 15. This unit is of cylindrical formation and includes upper and lower sections 47 and 48 integrally connected by means of a series of equidistantly spaced vanes 49, 50 and 51, the vanes and the upper and lower sections combining to form a series of peripherally arranged chambers 52, 53 and 54.

Rotatably mounted within the rotor 18 in an annular, co-axial recess 55 and extending downwardly to the section 48 is a ring gear 56. This ring gear as disclosed in Fig. 7 comprises upper and lower gear sections 57 and 58, the gear as a whole being retained in the unit 18 by suitable means such as a split collar or the like 59 which also serves to form division between the said gears. As shown in Fig. 7, section 58 of the gear lies intermediate the sections 47 and 48 at the inner periphery of the vanes 49, 50 and 51. Here it will also be noted that the ring gear is rotatable independent of the rotative movement of the member 18 as will be later referred to.

A further feature of the invention is the rotary compressor member 16 shown fixedly mounted upon shaft 60. As illustrated in Fig. 4 this unit is characterized by equidistantly spaced segments 61, 62 and 63 peripherally toothed as at 64 and intersegmental recesses 65, 66 and 67 while fixedly mounted upon the shaft 60 above the segments is a gear 68.

From what has thus far been described it will be seen that the segments and intersegmental recesses are alternately brought into engagement with the ring gears 44 and 58 and the vanes of the members 15 and 18 while the gear 68 engages the gears 43 and 57.

Air induction unit 17 is fixedly mounted upon shaft 69 and is identical in structure to that of unit 16 just described. The segments of this unit are numbered 70, 71 and 72, the intersegmental spaces or recesses 73, 74 and 75, and the upper gear is numbered 76. The segments and intersegmental recesses of this unit are designed to be alternately brought into engagement with the ring gear 44 and the vanes of the unit 15 while the gear 76 meshingly engages the gear 43.

As previously mentioned the compression pressure of the engine may be varied. One means of accomplishing this is to alter the relative capacity of section C of the combustion chambers 37, 38, 39 and 40. For example, the smaller the section C, the higher becomes the compression pressure, other chamber remaining unchanged.

Gears 77, 78, 79 and 80 (see Fig. 1) are fixedly mounted adjacent the lower ends of shafts 27, 60, 69 and 46 and are termed lower harmonizing gears while gears 68 and 76 combine with gears 43 and 57 to form what is termed upper harmonizing gears. The upper train of harmonizing gears is designed to regulate the engagement of the segments of the units 16 and 17 with the ring gears 44 and 58 of the units 15 and 18 while the lower train of harmonizing gears is adapted to regulate the engagement of the vanes of the members 15 and 18 with the intersegmental recesses of the units 16 and 17. Finely pitched teeth are provided for the upper harmonizing gear train including the gear sections 44 and 58, the fine pitch of the latter being designed for the purpose of effecting a laminated seal where segmental teeth and ring gears meet.

The pitch diameter of the gears 68 and 76 as well as the toothed segments is greater than the pitch diameter of the gears 78 and 79 and a relatively higher peripheral speed obtains in the upper train of harmonizing gears during operation. The differential in the peripheral speed of the two trains of harmonizing gears is compensated for by the fact that the ring gears are rotatable independent of the units 15 and 18 as hereinbefore mentioned.

Figure 1:
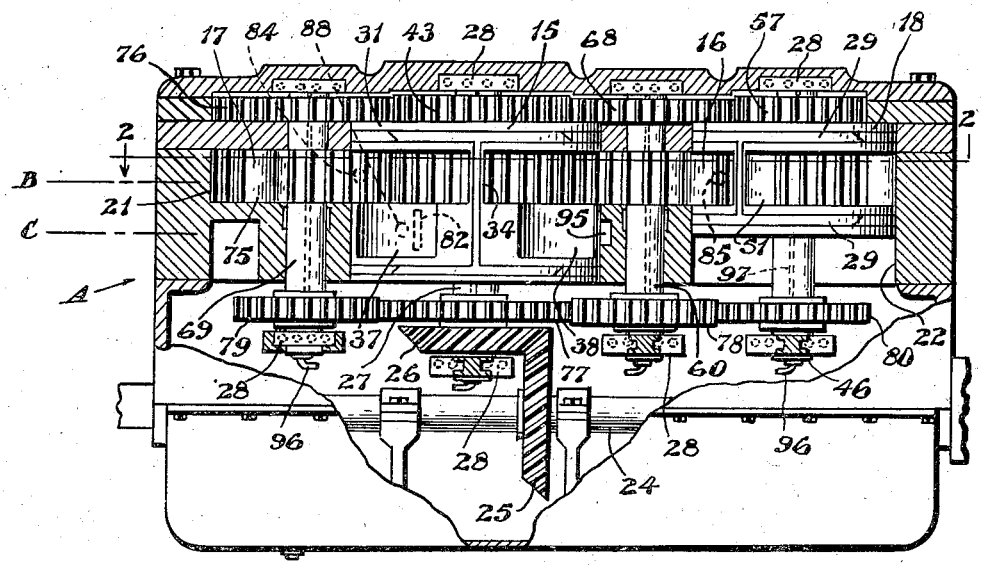
Fig. 1 is a longitudinal sectional elevation of an internal combustion engine disclosing an embodiment of the present invention.

The engine as presently illustrated in Figs. 1 and 2 combines the train of rotor members to form a series of closed chambers which through a series of specifically located ports and by-passes communicate, as required, with one another and with manifolds through which free air and a combustible fuel are introduced and the spent gases of combustion are exhausted. The vanes and segmental members previously mentioned function in a manner similar to that of a rotary gear pump, creating chambers that fill with gases or fluid during disengagement and displacing the contents of these chambers as they reengage.

Combustible fuel is conducted to the cylinder 19 from a carburetor (not shown) through intake manifold 81 and port 82 while free air entering intake manifold 83 passes through port 84 to cylinder 21 and through inlet port 85 which jointly serves cylinders 20 and 22. Port 82 it will be seen lies in a plane corresponding to that of section C of the combustion chambers whereas port 84 lies in a plane corresponding to that of section B, thus, I provide a controlled fuel intake for the cylinder 19 which is removed from the air intake in cylinder 21. A portion of the air admitted through port 84 is adapted to assist in scavenging the spent gases of combustion as will be later referred to.

Free air is admitted to the scavenging member through port 85 from whence it is conducted by the respective chambers to the outlet port 86 which through manifold 87 communicates with port 88 in cylinder 19 where with additional air admitted through port 84 it displaces the spent gases in the combustion chambers exhausting them through port 89 and exhaust manifold 90. Port 89 it will be seen serves both cylinders 19 and 21. It will also be observed that port 88 lies in a plane corresponding to that of section C of the combustion chambers whereas port 89 lies in a plane corresponding to that of section B of these chambers. Thus I provide means for delaying the scavenging operation until the power impulse has spent itself in effective work and port 89 is communicated with for removing the spent gases of combustion.

A residual quantity of free air in cylinder 22 reaches exhaust manifold 90 through port 91 while a residual quantity of the spent gases of combustion from cylinders 19 and 20 are exhausted through this same port by means of by-pass 92 in cylinder 20.

The by-pass 93 formed in the wall of the cylinder 19 is designed to establish communication between consecutive combustion chambers in the unit 15 as the vane members pass thereby. Thus the residual gas of a compression cycle which has not been displaced from section B of the combustion chambers unites at one and the same time with a freshly charged combustion chamber in cylinder 19 and the free air charge in cylinder 20 which has been admitted through port 85 thereby equalizing all three immediate chamber pressures at the initiation of each compression phase.

It is considered well to mention here that for each revolution of rotor 15 in the present invention, the volume capacity for combustible fuel mixture equals four times the volume capacities of chambers 37 and 65. Accordingly, the power-to-weight ratio of the instant engine is definitely increased over that of other known types.

Means for igniting the combustible mixture may take any suitable form and in the present invention I have shown spark-plug means 94 mounted in port 95 of the cylinder 19. In operation the respective combustion chambers, moving in a plane corresponding to section C, have direct communication with the port 95 at a time when it contains compressed combustible fuel and where, at a predetermined degree of movement, the explosive mixture is ignited by the spark-plug means.

Lubrication means for the operating mechanism of the engine is illustrated as comprising a series of oil-fed lines 96 leading to the lower ends of the rotor shafts. The lubricant is fed from an oil pump of well known structure (not shown) and delivered under pressure to shaft center bores 97 from which radiating ducts convey the lubricant to the bearings and spill it over the harmonizing gears and an abundance of lubricant reaches the ring gear recesses where it serves both lubricating and cooling purposes.

*Operation*

In operation, the rotation of unit 15 revolves the respective combustion chambers about the axis of the shaft 27, the rotation of the units 16, 17 and 18 being co-ordinated through the lower harmonizing gear train. As a consequence of the pumping action of the vanes and chambers, combustible fuel and air is drawn into closed chambers where it is mixed, compressed and then exploded, the non-mixed portions of air being diverted, as hereinbefore mentioned, to effect the complete scavenging of the spent gases of combustion.

In sequence of operation then the relative position of each unit changes thus when vane 33 becomes disengaged from the intersegmental recess 73, the chambers 37 and 73 commence to take form and free air is admitted through port 84 (see Fig. 8). Further rotation of the unit 15 brings segment 70 of unit 17 to the converging line between cylinders 19 and 21, adjacent port 84, when combustible fuel is admitted through port 82 to the chamber 37, port 84 having been closed by segment 70. Concurrently with the progressive formation of chamber 37, chambers 52 and 65 are forming in the respective cylinders 20 and 22 and fill with free air through port 85 while chamber 73 is transporting its charge of free air towards port 89.

When the chamber constituting recess 74 of the segmental unit 17 comes into communication with the port 84, section C of the chamber 37 has advanced to a position just beyond intake port 82 and prevents any further addition of combustible fuel to the chamber. A small amount of combustible fuel will, at this time, escape from chamber 37 and enter chamber 38 but such fuel would be immediately displaced into newly forming chamber 38 due to the indraft of additional free air through port 84. As the vane 34 reaches the converging line between the cylinders 19 and 21, adjacent port 84, the intake phase from ports 82 and 84 is complete. In the meantime however chamber 65 has admitted a charge of free air through port 85 and is advancing to engage vane 33 of unit 15 and to add its contents to that already contained in chamber 37.

The compression phase is initiated when the chamber 65 first communicates with cylinder 19 and the by-pass 93 establishes co-instantaneous union between the chambers 37 and 40. The compression phase persists through a rotative movement of approximately ninety degrees for the rotor 15 during which the contents of chamber 37 have been compressed and for the most part displaced from section B into section C of the chamber 37 (see Fig. 9), the undisplaced portion remaining behind to combine with the next succeeding compression phase which is initiated as vane 34 registers across the by-pass 93 and chamber 66 establishes communication with cylinder 19. Thus an equalized pressure is effected in all three combining volumes and the end of one compression phase merges with the initiation of the next succeeding compression phase to create smooth uninterrupted action.

During the compression phase, segment 61 of the unit 16 enters section B of chamber 37 and while displacing the combustible mixture therefrom isolates such section from section C which is now charged with compressed combustible fuel. Section C of the chamber 37 now passes through a rotative movement of approximately twenty degrees under seal of the segment 61 during which it moves from the compression side to the combustion side of the engine being meanwhile in direct communication with the port 95 in which the ignition means is mounted (see Fig. 10). By well known means the ignition is caused to spark during this twenty degree phase, either end of which simulates dead center poise in conventional internal combustion engines.

As the ignition means ignites the compressed combustible fuel, expansion pressure is applied to vane 33 which propels rotor 15 in a clockwise direction carrying therewith shaft 27, gears 23 and 25 and main drive shaft 24 from which source power is taken.

The progressive rotation of unit 15 brings vane 33 to the point of convergence of cylinders 19 and 21 at the port 89 when communication is established with exhaust port 89 for the exhausting of the spent gases of combustion from chamber 37 (see Fig. 11).

During the power impulse, vane 34 moves to the next succeeding converging point of the cylinders 19 and 20 thus terminating the effective impulse in chamber 37. During this advance, a portion of the combustion pressure from chamber 37 extends into chamber 38 and intersegmental recess 66 where it effects an auxiliary driving impulse against the trailing edge of vane 34 and against the segment 61 finally exhausting by way of by-pass 92, port 91 and exhaust manifold 90. It will be observed that each power impulse persists through a rotative movement of ninety degrees when the expanding gases become merged with those of the next succeeding power impulse, thus effecting a smooth, uninterrupted driving pressure.

As the vane 33 advances to engage with the intersegmental recess 74 of the unit 17, the segment 71 of this unit moves rotatively into section B of the chamber 37 displacing its contents which exhaust through port 89.

Concurrently with the movement of the segment 71 into section B of the chamber 37, a charge of free air from chamber 52 of unit 18 is driven through port 86, manifold 87 and port 88 into section C of the chamber 37 causing displacement of the residual spent gases of combustion therein through port 89 and charging section C of chamber 37 with free air as it passes under seal of the segment 71, residual air in chamber 52 exhausting through port 91 and exhaust manifold 90. The chamber 37 then enters upon a new period of operative cycles.

What has been described in operative detail traces the operation of one of the combustion chambers through its power developing impulse with its various phases and consecutive sequences and cycles of operation and it will be understood that each of the chambers and operating units develops its power impulse in exactly the same manner with the result that a continuous flow of power impulses produces a consistently smooth power driving force.

The term "chambers" as employed in the specification either expressed or implied denotes those compartments in the rotatable units which when in the cylinder block are closed by the wall structure of the engine and where the chambers are defined as "forming" reference is made to those phases wherein the compartments have communication with one another but are advancing to a position when they will be closed by the wall structure of the engine.

The invention disclosed may be embodied in other specific forms without departing from the spirit or essential characteristics of the invention, the present disclosure is therefore to be considered in all respect as illustrative rather than restrictive and all changes coming within the meaning and range of equivalency of the claims are intended to be embraced therein.

What I claim as my invention is:

1. In an internal combustion engine, a cylinder block, a rotatable power member formed with a series of compartments adapted to form peripherally arranged combustion chambers and rotatably mounted in the cylinder block, rotary means for conducting a supply of air and a supply of combustible fuel to the combustion chambers, a ring gear rotatably mounted within the power member, a rotary compressor member engageable with the ring gear in the power member for sealing purposes and adapted to displace combustible fuel from one portion of the combustion chambers and to compress the combustible fuel in another portion of the said combustion chambers, sparking means for igniting the combustible fuel in the combustion chambers, rotary means for scavenging spent gases of combustion and harmonizing gears for regulating and coordinating the movement of the rotary members.

2. In an internal combustion engine, a cylinder block, a rotatable power member rotatably mounted in the cylinder block and formed with a series of spaced compartments adapted to form a series of peripherally arranged combustion chambers, rotary means adapted to supply a charge of air and a charge of combustible fuel to the combustion chambers, a rotatable ring gear mounted within the power member intersecting the combustion chambers, a rotary compressor member formed with a series of toothed segments adapted to consecutively engage the ring gear in the consecutive combustion chambers for sealing purposes and to displace combustible fuel from one portion of the combustion chambers and compress the said fuel in another portion of the said combustion chambers, rotary means for scavenging spent gases of combustion from the combustion chambers, sparking means for igniting the compressed combustible fuel and harmonizing gears for regulating and coordinating the rotative movements of the rotary members.

3. In a device of the character described, a cylinder block, a power developing member rotatably mounted in the cylinder block and provided with a series of successively arranged combustion chambers, a compressor member rotatably mounted in the cylinder block coacting with the power developing member and provided with a series of elements adapted to move into and out of a portion of each successive combustion chamber during rotative movement, the movement of the said element being adapted to displace combustible fuel from the said portion and to compress it into another portion of the combustion chamber, air and combustible fuel supply means for delivering air and combustible fuel to the combustion chambers during rotative movement, sparking means for igniting the combustible fuel in the combustion chambers and means for scavenging spent gases of combustion.

4. In a device of the character described, a cylinder block, a power developing member rotatably mounted in the cylinder block and provided with a series of peripherally arranged combustion chambers, an air induction member rotatably mounted in the cylinder block provided with a series of recesses, the said recesses being adapted to deliver a supply of air to the combustion chambers during rotative movement, a compressor member rotatably mounted in the cylinder block and provided with a series of segmental sections, the said sections being adapted to move into and out of a portion of each successive combustion chamber during rotative movement to displace combustible fuel from the said portion and compress it into another portion of the said combustion chamber, delivery means for supplying air to the air induction member and combustible fuel to the combustion chambers, sparking means for igniting combustible fuel in the combustion chambers and means for scavenging spent gases of combustion.

5. A device as set forth in claim 4 in which the recesses of the air induction member and the series of combustion chambers of the power developing member are adapted to successively and independently establish communication with the air and combustible fuel supply means.

6. In a device of the character described, a cylinder block, a power developing member rotatably mounted in the cylinder block and provided with a series of spaced combustion chambers, an air induction member provided with a series of segments and a series of intersegmental recesses, the said recesses being adapted to deliver air to the combustion chambers and the said segments being adapted to move into and out of a portion of each successive combustion chamber and to displace air from the said portion and to compress it into another portion of the combustion chamber, a compressor member rotatably mounted in the cylinder block provided with a series of elements adapted to move into and out of a portion of each successive combustion chamber and to displace combustible fuel from the said portion and to compress it into another portion of the combustion chamber, means for delivering a supply of air to the air induction member and a supply of combustible fuel to the combustion chambers during rotative movement, sparking means for igniting the combustible fuel in the combustion chambers and means for scavenging spent gases of combustion.

7. In a device of the character described, a cylinder block, a power developing member rotatably mounted in the cylinder block and provided with a series of spaced peripherally arranged combustion chambers, a compressor member rotatably mounted in the cylinder block provided with a series of segmental members and a series of recesses, the said segmental members being adapted to move into and out of a portion of each successive combustion chamber during rotative movement and to displace combustible fuel from the said portion and to compress it into another portion of the combustion chamber and the said series of recesses being adapted to conduct air to the combustion chambers, means for delivering air and combustible fuel to the compressor recesses and combustion chambers respectively, sparking means for igniting combustible fuel in the combustion chambers and means for scavenging spent gases of combustion.

8. In a device of the character described, a cylinder block, a power developing member provided with a series of combustion chambers and rotatably mounted in the cylinder block, an air induction member, a compressor member and a scavenging member rotatably mounted in the cylinder block coacting with the power developing member, the said compressor member being provided with a series of segmental sections adapted to move into and out of a portion of each successive combustion chamber during rotative movement and to displace combustible fuel from the said portion and to compress it into another portion of the combustion chamber, the said air induction members being provided with a series of segmental sections adapted to move into and out of a portion of each successive combustion chamber and to displace air from the said portion and to compress it into another portion of the combustion chamber, the said scavenging member being formed with a series of segmental sections and a series of recesses, the said segmental sections being adapted to engage the segmental sections of the compressor member during rotative movement and the said recesses being adapted to deliver air to the combustion chambers for scavenging spent gases of combustion, means for delivering air to the air induction member and the scavenging member and combustible fuel to the power developing member, sparking means for igniting the combustible fuel in the combustion chambers and gear means for harmonizing the rotatable movements of the rotatable members.

9. In a device of the character described, a cylinder block, a power developing member rotatably mounted in the cylinder block provided with a series of dividing walls and a series of combustion chambers, a compressor member formed with a series of segments, the said segments being adapted to engage the dividing walls during rotative movement and to move into and out of a portion of each combustion chamber to displace combustible fuel from the said portion and to compress it into another portion of the combustion chamber, rotatable means coacting with the power developing member and the compressor member for delivering air and combustible fuel to the combustion chambers and scavenging spent gases of combustion from the combustion chambers during rotative movement of the rotatable members, sparking means for igniting combustible fuel in the combustion chambers and sealing means for the dividing walls adapted to seal one combustion chamber from another.

10. A device as set forth in claim 3 in which by-pass means is provided for establishing an equalizing pressure between a combustion chamber in which combustible fuel is being compressed and the next succeeding combustion chamber.

11. In a device of the character described, a cylinder block provided with an air induction inlet and combustible fuel inlet means and air scavenging inlet and outlet means, a power developing member rotatably mounted in the cylinder block provided with a series of spaced combustion chambers, a compressor member, an air induction member and a scavenging member rotatably mounted in the cylinder block, the said compressor member being adapted to move into and out of a portion of each combustion chamber during rotative movement and to displace combustible fuel from the said portion and to compress it into another portion of the combustion chamber, the said air induction member being adapted to communicate directly with the air induction inlet for the admission of air during rotative movement, the said combustion chambers being adapted to communicate directly with the combustible fuel inlet and the said scavenging member being adapted to communicate directly with the air scavenging inlet and with the combustion chambers during rotative movement, the said combustible fuel inlet being in advanced relationship to the air induction inlet, the said air scavenging inlet being in advanced relation to the combustible fuel inlet and the air scavenging outlet being in advanced relationship to the air scavenging inlet to successively and independently admit air and combustible fuel to the combustion chambers and to scavenge spent gases of combustion and sparking means for igniting combustible fuel in the combustion chambers.

B. H. SPARLING BEACH.